July 11, 1967 R. LOYEN 3,330,969
ELECTRONIC DEVICE FOR SWITCHING LOW-LEVEL VOLTAGE SIGNALS
Filed June 9, 1964
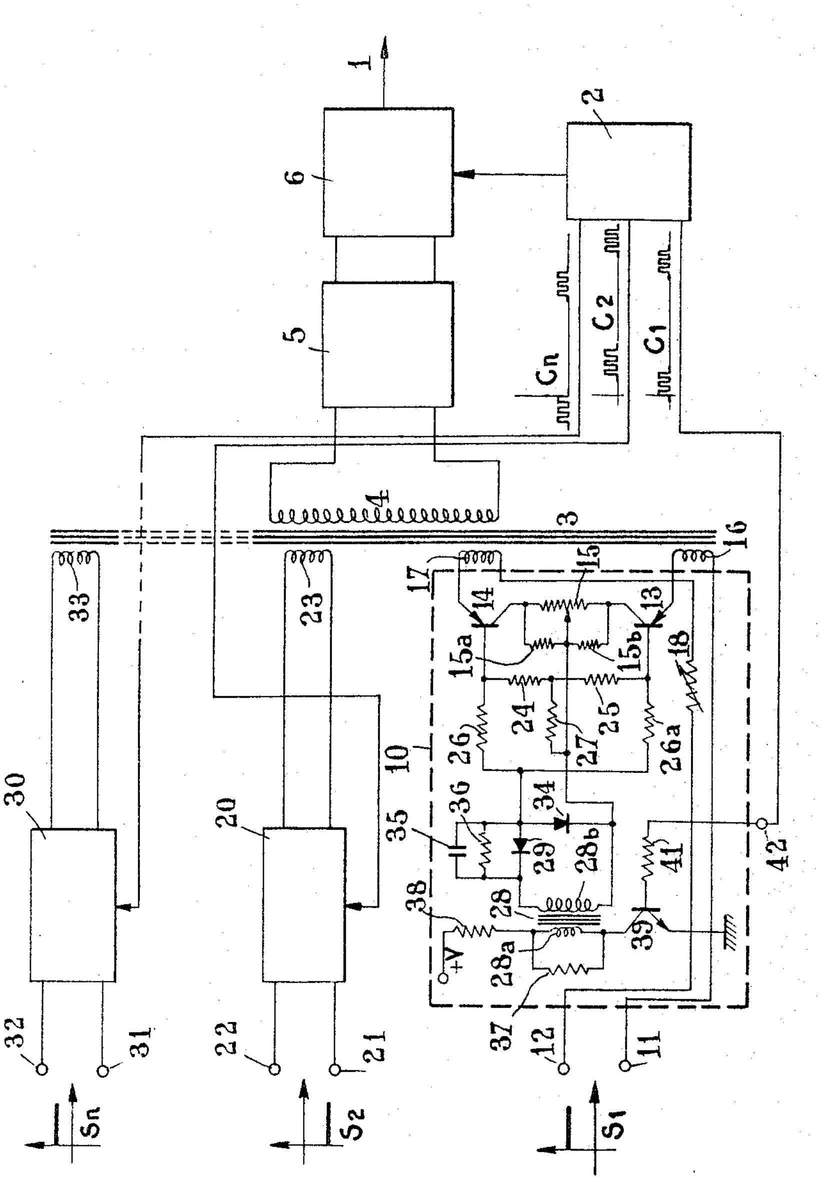

3,330,969

ELECTRONIC DEVICE FOR SWITCHING LOW-LEVEL VOLTAGE SIGNALS

Roger Loyen, Vernon, France, assignor to Etat Francais (French State) represented by the Minister of Armed Forces, Ministerial Delegation for Armaments, Direction of Research and Munitions, Laboratory of Ballistic and Aerodynamic Researches, Vernon, France Filed June 9, 1964, Ser. No. 373,795
Claims priority, application France, June 21, 1963, 938,961, Patent 1,391,696
3 Claims. (Cl. 307—88.5)

This invention relates to an electronic device for switching low-level voltage signals, i.e., signals of which the amplitude may vary within a range of —100 millivolts to +100 millivolts in relation to a reference potential, for transmitting these voltage signals on a single line, this device comprising a plurality of gates receiving at their input the various voltage signals and having their outputs connected in common to said single output line, said gates being normally closed and adapted to be opened successively and cyclically by periodic switching signals, said device being characterized in that each gate comprises at least one chopper transistor, the voltage signal to be transmitted through said gate being fed between the emitter and collector electrodes of said transistor, the transformed or non-transformed switching signal being applied to the base electrode of said transistor in order to produce a hatched current in the collector-emitter circuit, and that the collector-emitter circuits of the chopper transistors of the various gates comprise each a primary winding of an output transformer common to all the gates and of which the secondary winding is connected to said single output line.

The switching device according to this invention is advantageous in that it permits of switching on a single line, at a rate ranging from zero to several thousands switchings per second, a number of so-called "low-level" variable electronic voltages having a maximum amplitude range of the order of ± millivolts.

On the other hand, the use of an output transformer having separate primary windings for each input circuit permits of avoiding any galvanic connection between the input circuits.

In order to afford a clearer understanding of the present invention and of the manner in which the same may be carried out in practice, a typical form of embodiment thereof will be described hereinafter with reference to the single figure of the accompanying drawing showing a block and wiring diagram of the switching device of this invention.

The switching device according to the present invention comprises a plurality of gates 10, 20 . . . 30 to the inputs of which voltage signals S1, S2 . . . S*n* are applied the amplitude of these voltage signals ranging from —100 millivolts to +100 millivolts in relation to a reference potential which is the earth voltage. The number of gates is equal to the number of voltage signals to be switched on a single output line 1.

The gates 10, 20 . . . 30 are normally closed and may be opened successively and cyclically by switching signals C1, C2, . . . C*n* respectively. These switching signals consist each of trains of hatched signals having a constant frequency, for example of the order of 40 kHz., which may be emitted from a clock 2, the trains of signals C1, C2 . . . C*n* appearing during successive time periods of the clock cycle.

The voltage signals S1, S2, . . . S*n* are fed respectively between the pairs of input signals 11 and 12, 21 and 22, 31 and 32 of gates 10, 20, 30 respectively. Since these gates are made in the same manner, only one of them will be described hereinafter in detail, namely gate 10. This gate comprises essentially two chopper transistors 13, 14 of the PNP type in the example illustrated and described herein, the emitter-collector circuits of these transistors being connected in series through a zero equilibrium potentiometer 15, a pair of parallel-connected resistances 15*a*, 15*b*, being provided between the slider of potentiometer 15 and its two ends. The emitter electrodes of transistors 13 and 14 are connected to the input terminals 11 and 12 respectively through primary windings 16 and 17 of a common output transformer 3, this connection being in series with a variable resistance 18. The secondary winding 4 of this transformer is connected to the input of an amplifier 5 feeding a demodulator 6 having its output connected to the output line 1.

Similarly, the other gates 20 . . . 30 comprise similar pairs of output windings shown in the form of single primary windings 23 and 33 in the drawing.

The base electrodes of transistors 14 and 13 are interconnected through two parallel circuit branches comprising respectively resistances 24 and 25 in series and resistances 26 and 26*a* in series.

The junction point of said resistances 24 and 25 is connected through another resistance 27 to the slider of potentiometer 15, i.e. to the junction point of resistances 15*a* and 15*b*. This last-named junction point is also connected to one end of a secondary winding 28*b* of a ferrite transformer 28. The other end of a secondary winding 28*b* is connected through a diode 29 to the junction point provided between the aforesaid resistances 26 and 26*a*. Another diode 34 is connected in parallel to the secondary winding 28*b* and a condenser 35 and resistance 36 are connected in parallel across the terminals of diode 29.

The primary winding 28*a* of transformer 28, to which a resistance 37 is connected in parallel, has one end connected to a source of positive voltage +V through a resistance 38 and its other end connected to the collector electrode of a NPN-type transistor 39. The emitter electrode of this transistor is earthed and its base electrode is connected through another resistance 41 to a terminal 42 receiving the switching signal C1.

The gate 10 operates as follows: In the absence of the switching signal C1 the transistor 39 is blocked as well as transistors 13 and 14. Thus, gate 10 is closed. When the switching signal C1, appearing in this case in the form of a train of positive-alternation pulses, is fed to terminal 42, transistor 39 becomes alternatively conducting and non-conducting, the conducting periods corresponding to the positive alternations of said signal C1. Thus, a hatched current flows through the primary winding 28*a* of transformer 28, this current being transmitted to the secondary side of the transformer. The diodes 29 and 34 will chop the hatched current flowing through the secondary winding 28*b*. This current is fed simultaneously to the two base electrodes of transistors 13 and 14, thus causing these two transistors to become operative by turns, or, otherwise stated, switching these transistors successively to their conducting condition and to their blocked condition. The emitter-collector circuit of these transistors and therefore the primary windings 16 and 17 receive a hatched current the amplitude of which is subordinate to the voltage signal S1 fed between the terminals 11 and 12.

Under these conditions, the secondary winding 4, during the time period in which the switching signal C1 appears, receives a hatched signal the amplitude of which is a function of the amplitude of the voltage signal S1 fed between the terminals 11 and 12. The signal collected by the secondary winding 4 is subsequently fed to amplifier 5 and demodulator 6, the latter receiving a demodulating signal C of same basic frequency as the various switching signals C1 . . . C*n*. Thus, successive signals representing the respective input signals S1 . . . S*n* are received by the single output line 1.

Typical values of the principal components of gate 10, which are particularly adequate when the voltage signals S1 . . . S*n* have a maximum amplitude range of +10 millivolts, are shown hereinafter by way of example, it being understood that these values should not be construed as limiting the present invention:

| | |
|---|---|
| Potentiometer **15** | 100 |
| Resistance **15*a*** | 100 |
| Resistance **15*b*** | 100 |
| Resistance **24** | 20K |
| Resistance **25** | 20K |
| Resistance **26** | 1K |
| Resistance **26*a*** | 1K |
| Resistance **27** | 10K |
| Condenser **35** ----pf-- | 10,000 |
| Resistance **36** | 10K |
| Resistance **37** | 1K |
| Resistance **38** | 1K |
| Resistance **41** | 6K |

+V=+volts.

Of course, the form of embodiment of the invention which is described hereinabove with reference to the accompanying drawing is given by way of example and should not be considered as limiting this invention, since many modifications may be brought thereto without departing from the spirit and scope of the invention as set forth in the appended claims. Thus, while the example described and illustrated comprises two chopper transistors 13 and 14 to eliminate switching noise, a similar circuit of gate 10 could be designed wtih a single chopper transistor, without altering the mode of operation of the device.

What I claim is:

1. An electronic device for switching low level voltage signals, i.e. signals of which the amplitude may vary within the range of minus 100 millivolts to plus 100 millivolts in relation to a reference potential and transmitting said voltage signals to a single output line, comprising a clock pulse generator emitting periodic switching signals each of which comprises a pulse train, the pulses in each train having a constant frequency, the pulse trains being emitted during the course of successive periods of time, a plurality of normally closed gates having their outputs connected in common to said single output line and each arranged to receive one of the voltage signals at its input, said gates being arranged to be successively and cyclically opened by said periodic switching signals emitted by said clock pulse generator, each of said periodic switching signals being applied to one of the gates, each gate comprising at least one chopper transistor arranged to receive a voltage signal related in amplitude and phase to the voltage signal applied to the input of said gate and to receive the switching signals on the base thereof in order to produce a pulsed current in the collector-emitter circuit, an output transformer comprising a plurality of primary windings connected respectively with the collector-emitter circuits of said various gates and a secondary winding, and a demodulator between said secondary winding and the output line, this demodulator being connected to the clock pulse generator and arranged to receive therefrom a train of demodulating pulses having the same frequency as the pulses forming each switching signal in order to re-establish on the output line the various voltage signals applied to the inputs of the gates.

2. A switching device as set forth in claim 1, wherein each gate comprises two chopper transistors having their emitter-collector circuits mounted in series.

3. A switching device as set forth in claim 1, comprising an auxiliary transistor adapted to receive said switching signal at its base electrode, and another transformer comprising a primary winding and a secondary winding, the emitter-collector circuit of said auxiliary transistor being connected in series to the primary winding of said other transformer of which the secondary winding is coupled with the base electrode of said chopper transistor.

References Cited

UNITED STATES PATENTS 3,227,892 1/1966 Basham ---------- 307—88.5
3,041,473 6/1962 Piazza ---------- 307—88.5

ARTHUR GAUSS, *Primary Examiner.*

J. BUSCH, *Assistant Examiner.*